United States Patent
Oscar et al.

(10) Patent No.: US 11,014,776 B2
(45) Date of Patent: May 25, 2021

(54) CABLE RECOVERY MACHINE

(71) Applicant: TESMEC S.P.A., Milan (IT)

(72) Inventors: Alberto Oscar, Castro (IT); Fabrizio Parodi, Presezzo (IT)

(73) Assignee: TESMEC S.P.A., Milan (IT)

( * ) Notice: Subject to any disclaimer, the term of this patent is extended or adjusted under 35 U.S.C. 154(b) by 0 days.

(21) Appl. No.: 16/420,987

(22) Filed: May 23, 2019

(65) Prior Publication Data

US 2020/0255257 A1    Aug. 13, 2020

(30) Foreign Application Priority Data

Feb. 8, 2019   (IT) ........................ 102019000001841

(51) Int. Cl.
| | | |
|---|---|---|
| *B65H 75/44* | (2006.01) | |
| *B65H 51/06* | (2006.01) | |
| *B65H 75/42* | (2006.01) | |

(52) U.S. Cl.
CPC ......... *B65H 75/4442* (2013.01); *B65H 51/06* (2013.01); *B65H 75/425* (2013.01); *B65H 75/4402* (2013.01); *B65H 75/4457* (2013.01); *B65H 2301/4189* (2013.01); *B65H 2701/34* (2013.01)

(58) Field of Classification Search
CPC .......... B65H 51/10; B65H 51/06; B66D 1/36; B66D 2700/026
USPC ........ 254/391, 397, 398, 411; 226/4, 17–19, 226/21, 28, 117, 177, 178
See application file for complete search history.

(56) References Cited

U.S. PATENT DOCUMENTS

| | | | |
|---|---|---|---|
| 1,221,594 A | | 4/1917 | Richman |
| 2,247,004 A | * | 6/1941 | Sullivan ................. E03F 9/005 15/104.33 |
| 3,121,361 A | | 2/1964 | Kramer |
| 3,144,949 A | * | 8/1964 | Haugwitz .......... H01B 13/0003 414/431 |
| 3,207,020 A | | 9/1965 | Passoni |
| 3,310,210 A | * | 3/1967 | Reib ..................... B29C 48/355 226/1 |
| 3,396,890 A | * | 8/1968 | Fulton .................... G11B 15/28 226/177 |
| 3,442,168 A | | 5/1969 | Gatto |
| 3,521,513 A | | 7/1970 | Gomann et al. |

(Continued)

OTHER PUBLICATIONS

Office Action for U.S. Appl. No. 16/420,798, dated Nov. 6, 2020, 19 Pages.

*Primary Examiner* — Emmanuel M Marcelo
(74) *Attorney, Agent, or Firm* — Maine Cernota & Rardin (57) ABSTRACT

A cable recovery machine, comprising at least one traction module configured to hold and draw at least one cable, in particular of a cable laying plant; the traction module comprises a frame on which one or more traction wheels and one or more idle wheels are positioned; between the traction wheels and the idle wheels a space is defined for the passage and traction of the cable to be recovered; the idle wheels are provided with a support connected in a mobile manner to the frame of the traction module and provided with actuators configured to press the idle wheels against the cable that passes between them and the traction wheels, so that the space between the idle wheels and the traction wheels can be automatically adjusted on the basis of the external diameter (D1, D2) or thickness of the cable drawn.

9 Claims, 4 Drawing Sheets

(56) References Cited

U.S. PATENT DOCUMENTS

| | | | | |
|---|---|---|---|---|
| 3,620,432 A | * | 11/1971 | Emery | B21C 35/02 226/172 |
| 3,728,923 A | | 4/1973 | Lanore | |
| 3,854,614 A | * | 12/1974 | Albrecht | B27B 25/02 414/432 |
| 4,022,092 A | | 5/1977 | Scheib et al. | |
| 4,048,831 A | * | 9/1977 | Fabian | B21B 39/006 72/251 |
| 4,244,250 A | | 1/1981 | Rudszinat | |
| 4,264,026 A | * | 4/1981 | Pomeret | H02G 1/08 226/176 |
| 4,411,194 A | * | 10/1983 | Davidson, Jr. | B41F 7/08 101/216 |
| 5,097,576 A | | 3/1992 | Kadono et al. | |
| 5,139,600 A | * | 8/1992 | Singer | B32B 37/00 100/331 |
| 5,497,928 A | * | 3/1996 | Burns | B21F 23/002 226/108 |
| 5,839,636 A | * | 11/1998 | Fleischmann | B65H 51/14 226/4 |
| 5,967,512 A | * | 10/1999 | Irsik | B65H 5/062 226/177 |
| 6,174,399 B1 | * | 1/2001 | DeCandia | A61F 13/0276 156/229 |
| 6,176,410 B1 | * | 1/2001 | Ueda | B41J 15/16 101/228 |
| 6,189,758 B1 | * | 2/2001 | Cherix | B65H 51/14 198/626.6 |
| 6,253,651 B1 | | 7/2001 | Bessemer | |
| 7,134,374 B1 | | 11/2006 | Williamson et al. | |
| 7,810,687 B2 | * | 10/2010 | DeFigueiredo | B65H 5/062 226/177 |
| 10,294,064 B2 | * | 5/2019 | Corley | B65H 51/10 |
| 2002/0108983 A1 | * | 8/2002 | Cote | B65H 23/1888 226/4 |
| 2010/0181360 A1 | * | 7/2010 | Perdue | B65H 23/1888 226/4 |
| 2011/0049211 A1 | * | 3/2011 | Schutz | B65H 51/10 226/172 |
| 2015/0008245 A1 | * | 1/2015 | Wortmann | H01R 43/28 226/181 |
| 2016/0355369 A1 | * | 12/2016 | Kang | B65H 51/08 |

* cited by examiner fig. 1 fig. 2 fig. 3 fig. 4

CABLE RECOVERY MACHINE

RELATED APPLICATIONS

This application claims priority to Italy Patent Application No. 102019000001841, filed Feb. 8, 2019. This application is herein incorporated by reference in its entirety for all purposes.

FIELD OF THE INVENTION

The present invention concerns a machine to recover a cable, such as for example an electrical conductor, a wire, an optical fiber, or suchlike, in particular for the continuous recovery of a cable of a cable laying plant and for its disposal, for activities to replace the existing cable in the laying plant.

The present recovery machine can be used in particular in a laying plant, for example, of a high voltage overhead electric line and in general in overhead lines which provide the commonly known "braked" laying of cables, that is of overhead conductors.

BACKGROUND OF THE INVENTION

In laying plants of overhead lines, the current method to replace overhead conductors, that is, so-called "reconductoring", provides the following operations:
  connecting the new conductor or a drawing wire to the existing conductor;
  positioning the pulleys to lay the conductor on the supports that form the segment of the line on which the conductor is being replaced;
  recovering the old conductor with a winch-brake, then storing the old conductor on empty reels previously prepared at the winch station;
  simultaneously releasing the new conductor from the reel on which it is wound with the use of a brake (or a winch-brake) at the brake station, to allow the "braked" laying of the new conductor;
  subsequently collecting and transporting the reels of old conductor to a recycling and disposal center, where it is broken down and divided according to the materials it is made of.

The high voltage overhead transmission lines can consist of single conductors (one per phase), but more typically they consist of multiple conductors for each phase, ranging from 2 to 6, but also with a tendency to increase up to 8 or 10 conductors.

The brake and winch stations are located at opposite ends of a section of the line on which the conductor is being replaced.

The winch station where the old conductor is recovered can consist of a winch-brake machine to recover the old conductor and of a number of reel-holding trestles at least equal to the number of conductors that make up each single phase of the line, or more generally to multiples of this number. The empty reels will then be installed on the trestles, and will collect the "old" conductor, which will then be disposed of in special recycling centers.

The brake station where the new conductor, or a drawing wire to be subsequently used to tension the new conductors, is unwound and tensioned, normally consists of a brake or winch-brake machine and a number of reel-holding trestles at least equal to the number of conductors that make up each single phase of the line, or more generally to multiples of this number.

The size of the winch and brake stations is proportional to this plurality of trestles on which the individual reels must be housed.

The winch-brakes to recover the existing conductor normally consist of a pair of winches for each conductor, the diameter of which is provided as 35 times the diameter of the conductor to be recovered.

Normally, the conductors that form the high voltage lines have multiple interruptions along their length, essentially due to the presence of so called mid span joints. Their function is to connect the two ends of the conductors during a reel change, that is, when a reel of new conductor ends, and the next reel begins.

Generally, the joints consist of straight aluminum and/or steel tubular cores with a variable length from 500 mm to 2000 mm.

The joints cannot pass over the winches, as they would break due to the bending caused by the winding on the circular surface, with the consequent catastrophic fall of the tensioned line.

For this reason, current reconductoring operations are subject to countless interruptions in the process; in essence, when a joint reaches the winch machine, the following steps must be followed:
  stop the winch machine when the joint is close to the winches;
  clamp the end of the conductor upstream of the joint with vices suitable to maintain the draw on the line;
  release the draw of the other end of the conductor on the winch side;
  cut and remove the joint in question;
  replace the cut joint with a flexible joint, for example a braid-type joint;
  resume the draw of the line with the winch machine;
  remove the vice that held the end upstream of the line;
  resume the reconductoring operations, until the braid-type joint exits the winch machine and appears on the reels that recover the old conductor;
  stop the winch machine again;
  clamp the end of the conductor on the winch side with vices suitable to maintain the draw on the line;
  release the draw of the other end of the conductor on the reel side;
  remove the braid-type joint and clamp the end of the conductor on the recovery reel;
  resume the draw of the line with the winch machine;
  remove the vice that held the end upstream of the line;
  resume reconductoring operations.

This sequence of operations must be repeated whenever a new joint arrives in front of the winch machine.

Furthermore, the process is interrupted whenever the new conductor present at the brake station runs out, and therefore the empty reel needs to be replaced with a full one, or when the old conductor reel at the winch station is full, and therefore the full reel needs to be replaced with an empty one.

At the end of the operations, the old conductor present on the reels filled at the winch station must also be disposed of.

Recovery machines exist that allow to recover the conductor and dispose of it in order to replace the existing conductor.

These machines generally comprise at least one cable traction module and at least one cable cutting module, so that the replaced cable can be cut into several parts and suitably stored, instead of being re-wound onto a reel.

The traction module can for example consist of a plurality of traction wheels, that is two or more pairs of wheels which are all motorized and between which the cable to be recovered and to be replaced is inserted. The cable to be recovered is pressed between the motorized wheels for example by means of jacks.

However, this known traction module has some disadvantages, particularly in relation to the need to adjust the amplitude of the passage space of the conductor which is defined between the motorized wheels. This adjustment may be necessary, for example, following the passage between the wheels of segments of cable with different diameters, for example segments of cable in which a connection joint is present.

Currently, this adjustment of the passage space is carried out by an external command which adjusts the reciprocal distance between the motorized wheels, therefore this adjustment is not carried out automatically and passively but requires suitable external piloting systems.

Furthermore, the known traction module does not allow to efficiently absorb the shocks normally generated by the passage of a joint or a sudden variation of the conductor section, therefore the pressure on the conductor is not kept constant. In fact, maintaining a constant pressure on the cable to be recovered, for example a conductor, allows to carry out recovery operations with greater efficiency, regardless of the external diameter or thickness of the cable to be recovered and of the variations in the thickness or external diameter.

There is therefore the need to perfect a cable recovery machine that can overcome at least one of the disadvantages of the state of the art.

One purpose of the present invention is therefore to provide a cable recovery machine which is provided with at least a traction module which is substantially able to adjust itself automatically and in particular in a passive manner whatever the external diameter or thickness of the cable to be recovered, therefore able to adapt, automatically and without any external piloting system, even to passages of consecutive segments of cable with different diameters, as can occur on the cable, for example, in correspondence with a joint.

Another purpose of the present invention is to provide a cable recovery machine that is able to effectively absorb the shocks generated by the passage of a joint or a sudden variation in the external diameter or thickness of the cable, keeping the pressure exerted during the passage of the cable or a joint almost constant.

Another purpose of the present invention is also to provide a cable recovery machine which allows to carry out, continuously and without interruptions, recovery operations of a cable so that it can be replaced and disposed of.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, one object of the invention is a cable recovery machine, comprising at least one traction module configured to hold and draw at least one cable, in particular of a cable laying plant.

According to one aspect of the invention, the traction module comprises a frame on which one or more traction wheels and one or more idle wheels are positioned; between the traction wheels and the idle wheels a space is defined for the passage and traction of the cable to be recovered; the idle wheels are provided with a support connected in a mobile manner to the frame of the traction module and provided with actuators configured to press the idle wheels against the cable that passes between them and the traction wheels, so that the space between the idle wheels and the traction wheels can be automatically adjusted on the basis of the external diameter or thickness of the cable drawn.

Advantageously, thanks to the use of one or more idle wheels cooperating with one or more traction wheels and able to exert a suitable pressure on the cable located between them and the traction wheels, it is possible to obtain a cable recovery machine in which the traction module is substantially able to adjust automatically and in particular in a passive manner whatever the external diameter or the thickness of the cable to be recovered, therefore able to adapt, automatically and without any external piloting system, even to passages of consecutive segments of cable with different diameters, as can occur on the cable, for example, in correspondence with a joint.

The present cable recovery machine is also able to effectively absorb the shocks generated by the passage of a joint or a sudden variation in the external diameter or thickness of the cable, keeping the pressure exerted during the passage of the cable or a joint almost constant.

The traction module can comprise at least one pair of idle wheels opposite at least one pair of traction wheels, so as to act on a segment of cable even more effectively and uniformly.

The traction module can comprise at least two pairs of traction wheels and at least two pairs of idle wheels, so as to provide an effective, uniform and simultaneous grip even on consecutive sections of cable with different diameters.

The traction wheels can be driven in pairs by means of a corresponding drive mean, such as a gearmotor or other, so as to allow the passage of differentiated sections of the cable in a situation of total control of the drawing action applied.

In some embodiments, each idle wheel can be provided with a corresponding actuator and a support connected to the frame by means of a rotation pin.

According to further aspects of the invention, the traction wheels can be aligned on a lower part of the frame of the traction module and the idle wheels can be aligned on an upper part of the frame.

The frame of the traction module can also be connected to a support structure by at least one hinge and can be made to rotate with respect to the support structure and around the hinge by at least one actuator.

Preferably, the pressure actuators of the idle wheels are hydraulic cylinders.

The machine can also comprise at least one pair of rollers to guide and align the cable disposed at least in correspondence with an entrance side of the cable into the traction module.

The machine can comprise at least one auxiliary winch cooperating with the traction module and which can be used at least in the initial preparation steps of the recovery of the cable.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
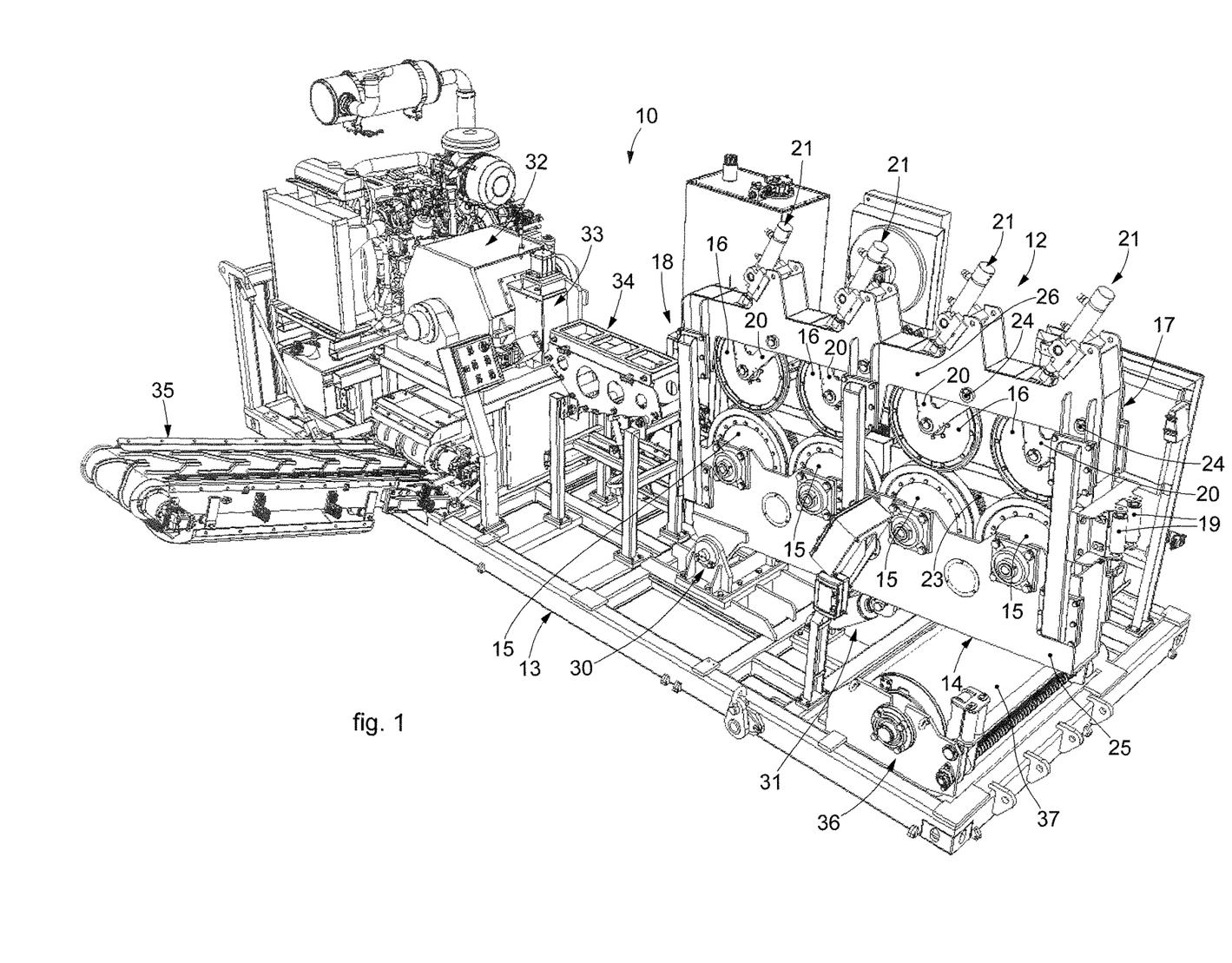
FIG. 1 is a three-dimensional view of a cable recovery machine according to the present invention.
Figure 2:
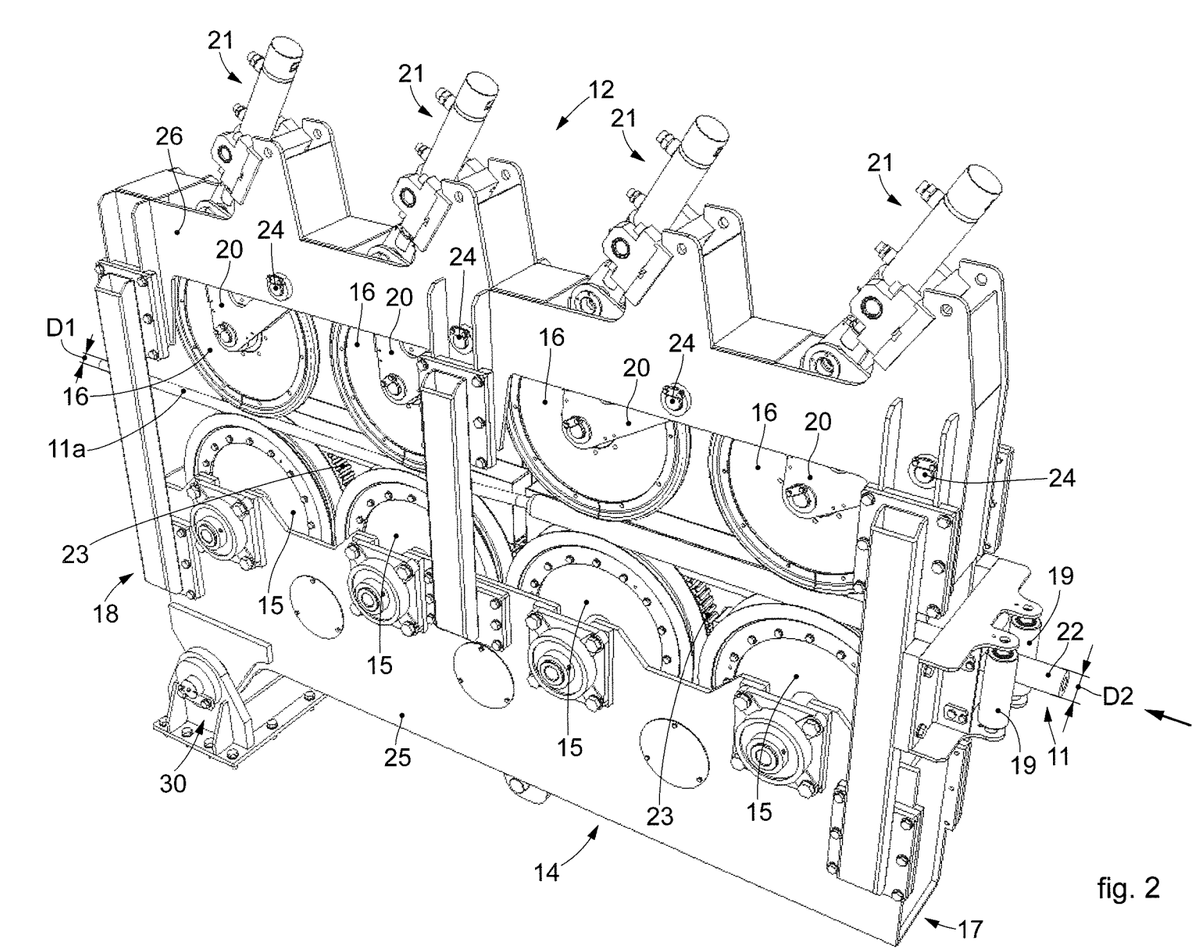
FIG. 2 is a first three-dimensional view of a traction module of the present cable recovery machine.
Figure 3:
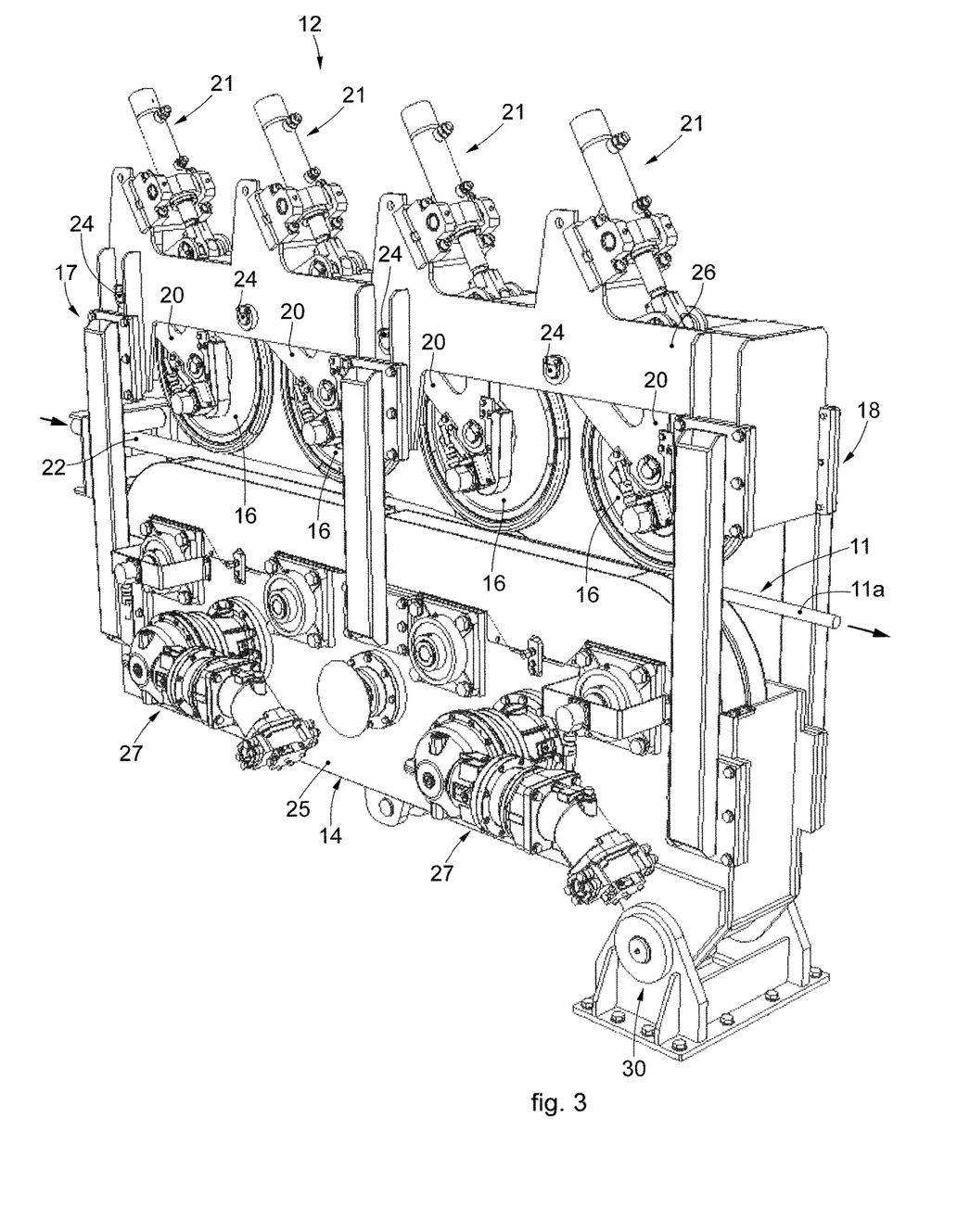
FIG. 3 is a second three-dimensional view of the traction module of the present machine.

With reference to the attached drawings and in particular to FIG. 1, FIG. 2 and FIG. 3 thereof, a machine 10 to recover a cable 11, in particular of a cable laying plant, comprises at least one traction module 12.

The traction module 12 is positioned above a support structure 13 of the machine 10, by means of which the machine 10 can be transported on a truck and can work both on the truck and directly on the ground.

The traction module 12 comprises a frame 14 on which one or more traction wheels 15 and one or more idle wheels 16 are positioned.

In particular, the traction module 12 comprises at least one pair of idle wheels 16 opposite at least one pair of traction wheels 15, so as to have a more effective and uniform grip on the cable 11.

Preferably, the traction module 12 comprises at least two pairs of traction wheels 15 and at least two pairs of idle wheels 16, so as to have an effective, uniform and simultaneous grip even on consecutive sections of the cable 11 with different diameter, such as for example the segment of cable 11a with external diameter D1 and the joint 22 with external diameter D2 of FIG. 2 and FIG. 3. The diameter D2 is larger than the diameter D1.

A space for the passage and traction of the cable 11 to be recovered is made between the traction wheels 15 and the idle wheels 16, by reciprocal distancing of the traction wheels 15 from the idle wheels 16, which is substantially determined by the entry of the cable 11 to be drawn into the traction module 12. The traction module 12 provides a side 17 for the entry and a side 18 for the exit of the cable 11 to be drawn. Rollers 19 to guide and align the cable 11 can be provided in correspondence with the entry side 17.

The idle wheels 16 are provided with a support 20 connected mobile, in particular rotatable, to the frame 14 of the traction module 12 and are provided with actuators 21 configured to press the idle wheels 16 against the cable 11 which passes between them and the first pair of traction wheels 15, so that the space between the idle wheels 16 and the traction wheels 15 can be adjusted automatically according to the diameter or thickness of the cable 11 drawn.

The idle wheels 16 could also provide a support 20 mobile sliding or translatable with respect to the frame 14 with the aid of the actuators 21.

Substantially, the purpose of the traction wheels 15 is to transmit the speed and the torque required for traction to the cable 11, while the purpose of the idle wheels 16 is to press the cable 11 against the traction wheels 15 with the correct pressure, so as to generate the correct friction on the cable 11 for traction operations.

The recovery speed of the cable 11 will therefore be determined by the speed of rotation of the traction wheels 15.

The traction wheels 15 can be made of different materials, for example steel, aluminum or suchlike and possibly be coated with rubber or other polymeric material, according to the friction that is to be generated on the cable 11.

Figure 4:
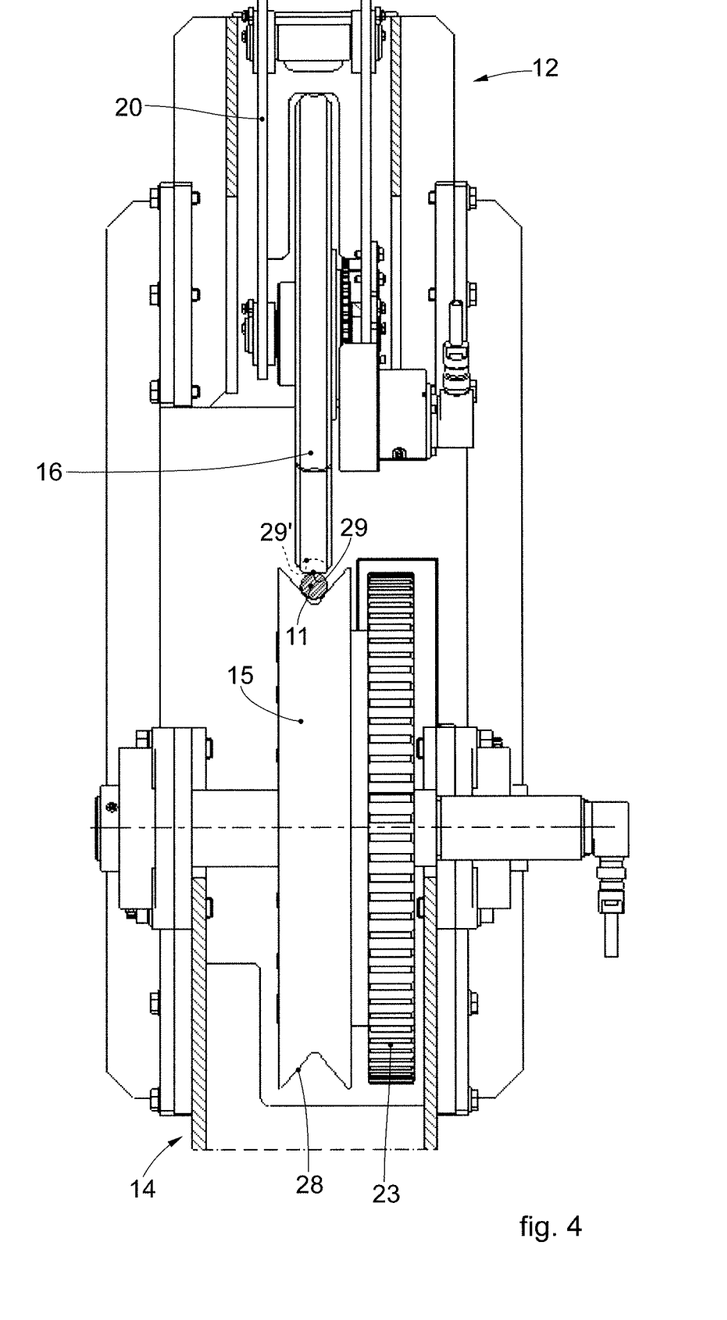
FIG. 4 is a cross-section view of the traction module of the present machine.

The traction wheels 15 can, for example, have an external V-shaped profile 28, see FIG. 4, according for example to the diameter of the cable 11 to be recovered and to the type of construction of the cable 11.

The idle wheels 16 can be made of metal materials such as aluminum, steel or suchlike.

The idle wheels 16 can have a flat external profile 29 or a concave external profile 29', see FIG. 4, with a radius of the concavity suitable to distribute the pressure generated by the idle wheels 16 on the cable 11 as uniformly as possible, maintaining its integrity and avoiding damage to it.

Each idle wheel 16 is provided with its own actuator 21 and its own support 20 connected to the frame 14 of the traction module 12 by means of a rotation pin 24, so that the idle wheels 16 are mobile independently of each other.

As can be observed, the traction wheels 15 are aligned on a lower part 25 of the traction module 12, while the idle wheels 16 are aligned on an upper part 26 of the traction module 12. The lower part 25 is the part of the traction module 12 facing the support structure 13 of the machine 10.

In the embodiment shown by way of example, the traction module 12 comprises two pairs of traction wheels 15 and two pairs of idle wheels 16, substantially so that at least two idle wheels 16 and two traction wheels 15 are always gripping the cable 11, even if this cable 11 has segments of different diameters, such as for example the cable segment 11a and the joint 22 which have respectively a diameter D1 and a diameter D2.

Preferably, see in particular FIG. 3, each pair of traction wheels 15 is driven by a corresponding gearmotor 27, or other suitable drive mean. In this way, there is total control of the drawing action applied to the cable even with the passage of segments of cable with different diameter or thickness, such as for example the cable segment 11a and the joint 22.

Preferably, the rotation speeds of the two pairs of traction wheels 15 will be suitably synchronized and coordinated so as to provide the same drawing speed to the cable 11.

The gearmotor 27 can provide, for example, a pinion which is positioned between the corresponding pair of traction wheels 15 and engages in the corresponding transmission wheels 23, one for each traction wheel 15, see in particular FIG. 4.

The actuators 21 of the idle wheels 16 are preferably hydraulic cylinders able to dampen the impacts with the additional function of being able to keep the pressure generated on the cable 11 constant, whatever the diameter or thickness of the cable 11.

The frame 14 of the traction module 12 can be connected to the recovery machine 10, in particular to the support structure 13, by a rotation hinge 30. The hinge 30 allows to vary the inclination of the traction module 12, with the aid of suitable drive means, such as for example at least a lifting or lowering actuator 31 or suchlike.

The recovery machine 10 comprises downstream of the traction module 12 a cutting module 32, which is used to divide the cable 11 into pieces of a given length, for storage and subsequent disposal. The purpose of this cutting module 32 is therefore to continuously cut the cable 11 exiting the traction module 12.

A device 33 to guide and draw the cable 11 inside the cutting device can be positioned between the traction module 12 and the cutting module 32.

The device 33 can be preceded by another alignment system 34 suitable to take the cable 11 into the correct position upstream of the device 33, for example a roller way or suchlike.

The cable 11 cut and exiting the cutting module 32 can be discharged from the machine 10 by, for example, a conveyor belt 35 or suchlike.

The machine 10 is also equipped with an auxiliary winch 36 cooperating with the traction module 12.

The auxiliary winch 36 is provided with a drum 37 able to be made to rotate by suitable drive means, for example an electric or hydraulic gearmotor, or suchlike, and around which a wire is wound. The auxiliary winch 36 will preferably have a maximum work load equivalent to the traction module 12. The diameter and the length of the wire loaded onto the auxiliary winch 36 will be aligned with the nominal performances of the machine 10.

The functions of the auxiliary winch 36 are the following: at the beginning of the reconductoring operations, it attaches the cable 11 onto the support of the line of the laying plant and puts it between the traction wheels 15 and the idle wheels 16 of the traction module 12; it is possible to connect the wire of the auxiliary winch 36 to the cable 11 by means of a flexible joint, for example a braid-type joint, or a self-tightening vice, and release the cable 11 by the desired length since the draw of the line will be maintained by the auxiliary winch 36. Without the auxiliary winch 36 it would not be possible to carry out operations in which the cable 11 is released, since the latter, being cut, would exit the space defined between the idle wheels 16 and the traction wheels 15, causing the line still present on the poles of the laying plant to fall.

As mentioned above, the machine in question can be transported by truck and can work both on trucks and also on the ground. In both cases the correct positioning on the ground and anchoring of the machine 10 or of the truck on which the machine 10 is positioned is required. This anchoring occurs through the use of straps, stabilizers and plates.

Once the positioning and anchoring have been completed, the machine 10 can be adjusted in height so that once the cable 11 has been cut it can be discharged into a suitable container by means of a conveyor belt 35 or by gravity.

Since the cable 11 on the support of the laying plant and the machine 10 will be at different heights, the next step is to adjust the inclination of the traction module 12, which needs to be aligned with the angle created between the cable on the line and the entrance side 17 of the traction module 12, to prevent the cable 11 from being misaligned and the joint 22 from flexing upon entry into the traction module 12. This operation is performed by driving the dedicated actuator 31 that rotates the traction module 12 around the hinge 30.

The next step is to make the cable 11 enter the traction module 12, in particular between the traction wheels 15 and the idle wheels 16. To do this, the machine 10 initially uses the auxiliary winch 36. It is possible, as seen, to connect the wire of the auxiliary winch 36 to the cable 11 on the support of the laying plant and start to draw the cable 11 from the support inside the traction module 12.

The cable 11 can be attached to the wire of the drum 37 of the auxiliary winch 36 by, for example, using self-tightening vices or other draw recovery systems.

The vice should preferably be placed at a distance from the beginning of the cable 11 suitable to create a length of "dead" cable that can then be inserted into the traction module 12.

Once the front end of the cable 11 arrives between the traction wheels 15 and the idle wheels 16, these are closed thus retaining the load (weight) of the line, thanks to the actuators 21.

The wire of the auxiliary winch 36 can then be disconnected from the cable 11 and recovered on the drum 37.

The operations of recovering the cable 11 can now begin.

The load acting on the cable 11, that is the draw on the line, is generated and maintained by the pressure generated by the crushing of the cable 11 between the traction wheels 15 and the idle wheels 16, which are pressed onto the conductor generating the necessary friction force, thanks to the rotation of their supports 20 around the rotation pins 24 and the actuators 21.

The recovery speed of the cable 11, on the other hand, is given by the speed of rotation of the traction wheels 15 located in the lower part 25 of the traction module 12. The traction wheels 15 are synchronized by pinions and transmission wheels, and all rotate at the same speed. Each pair of traction wheels 15 is equipped with its own gearmotor. The recovery speed is variable according to the load applied.

There will be different joints 22 on the spans of the laying plant, which connect different segments of cable, for example the segments of cable 11a. These have larger diameters and different materials.

In order to allow the passage of a joint 22 generally with a larger diameter than the cable 11 without having to interrupt the operations in any way, achieving a continuous recovery, the present traction module 12 is provided with one or more idle wheels 16 which automatically and passively, therefore without the need for external piloting systems, and thanks to the actuators 21, provide supports 20 which are rotated around the rotation pins 24 with a substantially circular trajectory, or substantially vertically, in the event of variations in the diameter of the cable 11, as shown in FIGS. 2 and 3. This allows the traction module 12 to self-adjust according to the diameter of the cable 11 to be recovered, and it is also able to absorb and adapt to the variation in diameter generated by the passage of a joint 22, therefore succeeding in not interrupting the operations to recover the cable 11.

The actuators 21, in particular hydraulic cylinders, in fact, have the dual purpose of self-adjusting the position of the idle wheels 16 to adapt to the different diameters and of absorbing the shocks generated by the passage of a joint 22 or by a sudden variation in section, keeping the pressure exerted by the idle wheels 16 on the cable 11 constant, therefore for example on the cable segment 11a or on the joint 22.

Once the cable has passed the traction module 12 it enters the cutting module 32.

The cable 11, once cut, is discharged into the special container by gravity or by means of the conveyor belt 35.

The work cycle of the machine 10 continues until all the old conductor on the line is recovered.

If during the work cycle there is a need to release a few meters of cable 11, the process is as follows: stop the rotation of the traction wheels 15 maintaining the pressure on the cable 11; drive the auxiliary winch 36; connect the wire present on the drum 37 with the branch of the cable 11 upstream of the machine 10 by means of a suitable vice or other draw recovery system; start drawing the drum 37 to take up the tension of the line; move the idle wheels 16 away from the traction wheels 15 of the traction module 12; release the cable 11 by means of the drum 37 and the wire to which it is now connected.

To restart the recovery and cutting activities, it is necessary to proceed as described in the first step of the cycle.

The machine 10 can have on board a power unit which consists of an endothermic diesel engine which will supply the number of revolutions and the torque necessary to drive the various actuators present on the system, that is, pumps, hydraulic motors, hydraulic cylinders, shears and other.

It is clear that modifications and/or additions of parts may be made to the cable recovery machine as described heretofore, without departing from the field and scope of the present invention.

It is also clear that, although the present invention has been described with reference to some specific examples, a person of skill in the art shall certainly be able to achieve many other equivalent forms of cable recovery machine, having the characteristics as set forth in the claims and hence all coming within the field of protection defined thereby.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

In the following claims, the sole purpose of the references in brackets is to facilitate reading: they must not be considered as restrictive factors with regard to the field of protection claimed in the specific claims.

What is claimed is:

1. A cable recovery machine, comprising at least one traction module configured to hold and draw at least one cable wherein said traction module comprises a frame on which one or more traction wheels and one or more idle wheels are positioned, between said traction wheels and said idle wheels a space being defined for the passage and traction of the cable to be recovered, said idle wheels being provided with a support connected in a mobile manner to the frame of the traction module and provided with actuators configured to press said idle wheels against the cable that passes between them and the traction wheels, so that the space between said idle wheels and said traction wheels can be automatically adjusted on the basis of the external diameter (D1, D2) or thickness of the cable drawn, and said cable recovery machine further comprising at least one auxiliary winch cooperating with said traction module.

2. The machine as in claim 1, wherein said traction module comprises at least one pair of idle wheels opposite to at least one pair of traction wheels.

3. The machine as in claim 2, wherein said traction wheels are driven in pairs by means of a corresponding drive means, so as to allow the passage of differentiated sections of the cable in a situation of total control of the drawing action applied.

4. The machine as in claim 1, wherein said traction module comprises at least two pairs of traction wheels and at least two pairs of idle wheels.

5. The machine as in claim 1, wherein each idle wheel is provided with a corresponding actuator and a support connected to the frame by means of a rotation pin.

6. The machine as in claim 1, wherein said traction wheels are aligned on a lower part of the frame of the traction module and said idle wheels are aligned on an upper part of the frame.

7. The machine as in claim 1, wherein said frame of the traction module is connected to a support structure by at least one hinge and is able to be made to rotate with respect to said support structure and around said hinge by at least one actuator.

8. The machine as in claim 1, wherein said pressure actuators of the idle wheels are hydraulic cylinders.

9. The machine as in claim 1, wherein said machine comprises at least one pair of rollers to guide and align the at least one cable, disposed at least in correspondence with an entrance side of the cable into the traction module.

* * * * *